United States Patent [19]
Rivin et al.

[11] 3,820,422
[45] June 28, 1974

[54] CANTILEVER TOOL MANDREL

[76] Inventors: Evgeny Izrailevich Rivin, ulitsa Vanvilova 70, Korpus 3, kv. 177; Jury Emanuilovich Lapin, Leninsky prospekt, 99, Korpus 115, kv. 10, both of Moscow, U.S.S.R.

[22] Filed: May 29, 1973

[21] Appl. No.: 364,403

[52] U.S. Cl......... 82/36 R, 82/DIG. 9, 408/143;144
[51] Int. Cl............................................. B23b 29/02
[58] Field of Search........ 82/36 R, DIG. 9; 408/143, 408/144, 199, 239, 713

[56] References Cited
UNITED STATES PATENTS

| | | | |
|---|---|---|---|
| 2,842,014 | 7/1958 | Miller | 408/144 |
| 3,164,041 | 1/1965 | Carlstedt | 408/144 |
| 3,678,632 | 7/1972 | Eversole et al. | 408/144 X |

*Primary Examiner*—Leonidas Vlachos
*Attorney, Agent, or Firm*—Eric H. Waters

[57] ABSTRACT

A cantilever tool mandrel applied to machining long openings in metals and other materials. It consists of at least two portions: the portion which is adjacent to the fastening place of the mandrel and the portion adjacent to the tool head located on the loose end of the mandrel and carrying the cutter. These portions are fabricated from materials with different moduli of elasticity and densities: the material for the portion adjacent to the fastening place of the mandrel should have a modulus of elasticity which is at least, 1.5 times higher than that of the material for the other portion. The density of the latter should be at least 1.5 times lower than that of the material of the former portion. The length of each portion of the mandrel is from 40 to 60 percent of the total length of the mandrel.

1 Claim, 3 Drawing Figures

CANTILEVER TOOL MANDREL

BACKGROUND OF THE INVENTION

The present invention relates to mechanical engineering and, more particularly, to tools for machining holes in metals and other materials.

The present invention can most effectively be applied for improving dynamic stiffness and vibration resistance of long and non-riged cantilever tool mandrels.

It is known that the machining of long holes, especially those with high length/diameter ratios is impaired by vibrations resulting from insufficient dynamic stiffness and vibration resistance of the tool. Vibrations occurring during cutting causes reduction of machining productiveness, increase in wear of the cutting tool, impairement of dimension accuracy and surface cleanliness of the machined workpiece.

It is further known that the vibration resistance of the tool can be raised by increasing the damping rate of the system, for which purpose oscillation dampers and vibration shock absorbers are incorporated in the tool. Though increasing essentially the vibration resistance of the tool, these devices however, make its design complicated. Besides, a considerable portion of the tool mass should comprise the inertia mass of the vibration shock absorber, and the larger this mass, the higher the efficiency of the shock absorber. This can be realized either when the dimensions of the tool are large enough, or when there is a definite relationship between the densities of the tool and shock absorber load materials. The aforementioned requirements, naturally, narrow the application scope of the oscillation dampers and vibration shock absorbers.

It is also known that in order to increase the stiffness, the tool is sometimes fabricated from a tool hard alloy having a high modulus of elasticity ($5.6.10^{10}$ kg/cm$^2$) as compared to steel. A disadvantage of this method is involved in the difficulty of machining the hard alloy, as well as in its high cost, especially for a tool of large dimensions.

It is further known that of two cantilever mandrels of the same dimensions, the one that has a higher frequency of natural oscillations, will have a higher vibration resistance (see, for example, the article by Robert S. Hann "Vibration Research: The Production Payoff Is Here," ("Machinery," USA, 1967, v.73, No.5). In this connection, cantilever tool mandrels are often fabricated from molybdenum (modulus of elasticity $E = 3.51.10^6$ kg/cm$^2$, density $\gamma = 10.2$ g/cm$^3$) in which case the natural frequency of the mandrel is 1.14 times higher than that of the steel mandrel of the same dimensions (modulus of elasticity of steel $E = 2.1.10^6$ kg/cm$^2$, density $\gamma = 7.8$ g/cm$^3$). However, the higher mass of molybdenum as compared to steel increases the mass of the tool. In case of a rotating tool operating with a pre-determined displacement with the respect to the rotational axis (e.g., the mandrels of boring machines are installed in the bore chucks with eccentricity), this factor results in undesirable increase of centrifugal forces and reduces the rotational speed of the tool. If use is made of vibration shock abosrbers built into a molybdenum mandrel or a hard-alloy mandrel (density 17 g/cm$^3$), as specified, for example, in U. S. Pat. No. 3,164,041, the relationship between the masses and densities of the inertia load of the shock absorber and the mandrel are impaired and, therefore, the efficiency of the shock absorber drops. This is especially true of the tool with a long working radius, since the relationship between the densities should, as is known, be related to the relative work radius of the mandrel as follows:

density of the load material/density of the mandrel material free boom of the mandrel dia./5 i.e., with the relative work radius of the mandrel being, e.g., equal to 10, the material of the shock absorber load should, at least, be twice as heavy as the material of the mandrel. This is practically impossible if the mandrel is to be fabricated from a hard alloy.

SUMMARY OF THE INVENTION

An object of the present invention is to provide a cantilever tool having a substantially high stiffness and the smallest possible effective mass.

Another object of the present invention is to provide a cantilever tool with a higher frequency of oscillations as compared to a conventional tool.

Still another object of the invention is to provide a cantilever tool which, when used with a shock absorber, can provide a higher efficiency of the latter.

These invention, other objects are attained in a cantilever tool mandrel having a head on its loose end with a cutting tool fastened therein. The mandrel, according to the invention is constructed of at least two portions fabricated from different materials, with one of the portions adjacent to the fastening place of the mandrel being fabricated from a material having a modulus of elasticity, at least, 1.5 times higher than that of the material from which the other portion of the mandrel is fabricated. This latter portion is adjacent to the head and has a density of material which is at least 1.5 times lower than that of the material of that portion of the mandrel which is adjacent to the fastening place of the mandrel. The length of each portion of the mandrel is from 40 percent to 60 percent of the total length of the mandrel.

As compared to prior-art designs, the composite mandrel of the invention has the following advantages:

a higher natural frequency of oscillations due to a more rational distribution of the mass and stiffness over the length of the mandrel. All other things being equal, the higher natural frequency of oscillations of the mandrel of the inventions provides a higher vibration resistance;

a more effective utilization of shock absorbers due to a better relationship between the masses of the inertia load and the mandrel, and obtained by reducing the effective mass of the mandrel;

utilization of vibration shock absorbers with lighter inertia loads due to an improved relationship between masses which results in reduced centrifugal forces. This makes it possible to increase the rotational speed of the tool during operation and, therefore, its productivity.

The composite mandrel of the present invention provides a high economic efficiency making it possible:

to increase the accuracy of machining and to improve the cleanliness of the machined surface due to a higher vibration resistance;

to increase productivity due to a reduction of the machining time (utilizing more intensive modes of cutting) and the auxiliary time (machining of long holes for one positioning of the workpiece).

Other objects and advantages of the invention will become apparent from the following detailed description of embodiments with reference to the accompanying drawings.

DESCRIPTION OF THE PREFERRED EMBODIMENTS

As is known, the cantilever mandrel is subjected in the course of operation to the effect of the transverse force applied to the tool fastened at the loose end of the mandrel. The bending moment acting upon the mandrel is equal to the product of the transverse force and the distance from the involved section of the mandrel to the point of force application. The moment assumes its maximum value near the fixing place when this distance is the longest. At the place where the transverse force is applied the moment is equal to zero. In connection with the above, the most loaded portion of the mandrel adjacent to the fixing place or fixed and should be fabricated from a material having a high modulus of elasticity. The portion of the mandrel spaced from the fixing place at a considerable distance and sustaining the effect of a much smaller bending moment, may be fabricated from a material with a smaller modulus of elasticity without any substantial loss of stiffness in the entire mandrel.

The natural frequency of oscillations of the cantilever mandrel is $f = 1/2\pi \sqrt{K/M}$, where $K$ = stiffness of the mandrel; and $M$ = its effective mass, i.e., the mass reduced to the loose end and equal to 0.23 of the mass of the entire mandrel. The value of the effective mass is, mainly, determined by the portion of the mandrel adjacent to the loose end where the amplitudes of oscillation assume maximum values. Therefore, to decrease the mass and increase the natural frequency of the mandrel, that portion should be fabricated from a material having a low density. The poriton of the mandrel at the fixed location where the amplitudes of oscillation are considerably lower, has a small effect on the value of the effective mass. Therefore, even though that portion is fabricated from a material with a high density, a substantial reduction of the natural frequency of oscillations will not occur.

The combination of materials for these portions may be most diversified, e.g.: steel plus aluminum or titanium alloy; tool hard alloy plus steel; molybdenum plus aluminum, etc. (The material for the portion of the mandrel adjacent to the fixed location is referred first everywhere). It has been found that the values of both the moduli of elasticity and the densities of the two materials should differ from each other by, at least, 1.5 times.

The effectiveness of the proposed design depends on the correct selection of the lengths of the portions to be connected. It has been found that the optimum value of the lengths depends on the combination of the materials, and the length of each portion of the mandrel should be from 40 percent to 60 percent of the total length of the mandrel.

Figure 1:
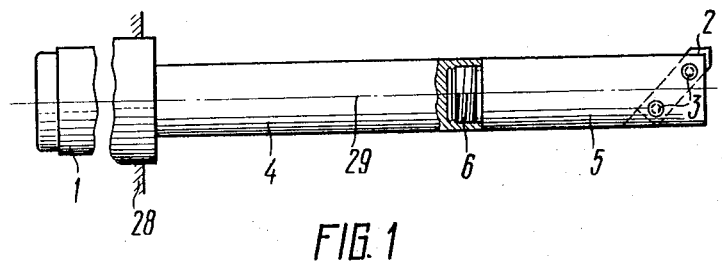
FIG. 1 is a side view showing a boring mandrel of the present invention when fastened to the spindle of a boring machine and rotated about the axis of the spindle.

The boring mandrel shown in FIG. 1 consists of a standard tapered shank 1 and a body whose free end accomodates a cutter 2 fastened with screws 3. The shank 1 and the body of the mandrel are shown as being constructed as an integral unit, although, they can, of course, also be composite connected by a sufficiently reliable method. The mandrel according to the invention is a composite unit: the portion 4 of the body adjacent to the shank 1 is fabricated from a material with a higher (at least, by 1.5 times) modulus of elasticity; the portion 5 of the body that carries the cutter is fabricated from a material with a lower (at least, by 1.5 times) density. The lengths of the portions 4 and 5 are, according to the invention, from 40 percent to 60 percent of the total length of the mandrel. The two portions are connected by a thread 6. However, any other sufficiently reliable method of connection may be applied.

Figure 2:
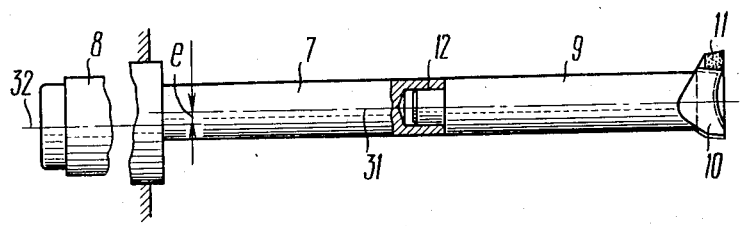
FIG. 2 is a side view of a boring machine mandrel of the present invention when installed into a boring chuck with eccentricity and rotated with a predetermined displacement about the axis of the spindle.

The mandrel shown in FIG. 2 consists of the portion 7 of the mandrel body adjacent to the shank 8 of the chuck (the chuck is not shown), the portion 9 of the body adjacent to the cutter head, and the cutter head 10 with a soldered cutter 11. The portion 7 of the body is fabricated from a material with a higher (at least, by 1.5 times) modulus of elasticity, whereas the portion 9 is made from a material with a lower (at least, by 1.5 times) density. The joint 12 of the two parts is accomplished by an interference (any other reliable connection is possible). The lengths of the portions 7 and 9 are from 40 percent to 60 percent of the total length of the mandrel.

Figure 3:
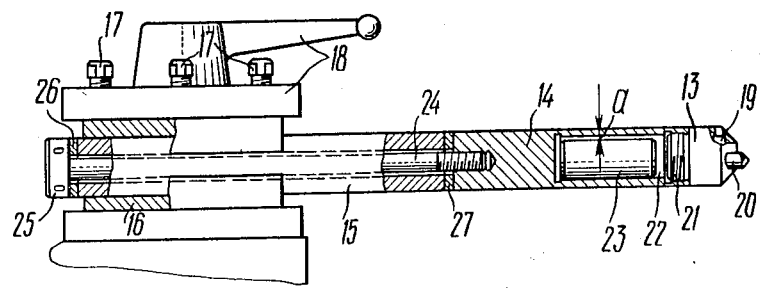
FIG. 3 is an elevational a boring mandrel of the present invention with a built-in vibration shock absorber for a turning lathe.

The mandrel shown in FIG. 3 consists of the cutter head 13, the portion 14 of the body to be installed into the holder 16. The holder 16 is of a rectangular cross-section and is tightened to the cutter holder 18 of a turning lathe by means of screws 17. The cutter 20 is fastened to the cutter head 13 with the screw 19. The cutter head 13 is fastened by means of a threaded connection 21 to the portion 14 of the body fabricated from a material with a density of, at least, 1.5 times lower than that of the material of the portion 15.

The portion 14 contains an inner cylindrical cavity 22 wherein the inertia load of the vibration shock absorber 23 is located with a clearance $a$. The portion 15 of the body is fabricated from a material whose modulus of elasticity is, at least, 1.5 times higher than that of the material of the portion 14 and has an extended opening. The the lengths of the portions 14 and 15, when the mandrel is moved by a maximum value of the holder, should be from 40 percent to 60 percent of the total length of the mandrel. The connection of portions 14 and 15 is accomplished by the rod 24 having a head 25 and passing through the washers 26, 27 as well as the opening in the portion 15, and is screwed into the portion 14. The portion 15 is rather simple and does not require complex mechanical treatment or processing which is essential in cases when it is fabricated from such hard-to-machine materials as a tool hard alloy.

During operation, shank 1 of the mandrel (FIG. 1) is installed into the tapered opening of the spindle of the machine (shown in the drawing by the fixed location 28). During boring, the mandrel is rotated about the axis of the spindle coinciding with the axis 29 of the mandrel. The cutting movement is set by the displacement of the cutter 2. The mandrel (FIG. 2) fixed in the boring chuck (not shown) whose shank 8 is installed into the standard opening of the spindle of the machine (shown by the fixed location 30). The axis 31 of the mandrel is displaced with respect to the axis 32 of rotation of the spindle with the chuck, by the required value of $e$. The mandrel (FIG. 3) during cutting is immobile, and the workpiece to be bored is rotated by being fixed in the spindle of the turning lathe (not shown). The mandrel has a variable radius of operation: in nonoperating condition it can be displaced about the axis of the holder 16 by the required amount to be fixed subsequently in the required position by the screws 17.

It should be emphasized that the mandrels shown in FIG. 1–3 are examples illustrating the present invention. Provision may be, of course, also made for other designs of composite mandrels and their structrual members, for other types of shock absorbers, and for the methods of connecting the portion of the mandrels, etc.

The proposed invention is, naturally, quite applicable for other types of cantilever tools such as, for example, internal drilling and milling mandrels, counterbores, gauging tool mandrels, etc.

We claim:

1. A cantilever tool mandrel comprising a head on its free end with a cutting tool fastened therein, at least two portions fabricated from different materials, one of said portions being adjacent to the fastening place of said mandrel and being fabricated from a material with a modulus of elasticity of at least 1.5 times higher than that of the material of the other said portions, said other portion being adjacent to said head and having a material density of at least 1.5 times lower than that of the material of said portion of the mandrel adjacent to the fastening place of the said mandrel, the length of each portion of said mandrel being from 40 percent to 60 percent of the total length of the mandrel.

* * * * *